3,193,052
ROTOR FOR ROTARY PISTON MACHINES
Hermann Bäumler, Burscheid, near Cologne, and Harry Lörcher, Witzhelden, Germany, assignors to Goetzewerke Friedrich Goetze Aktiengesellschaft, Cologne, Germany, a corporation of Germany
Filed Aug. 13, 1962, Ser. No. 216,458
Claims priority, application Germany Aug. 16, 1961
3 Claims. (Cl. 184—1)

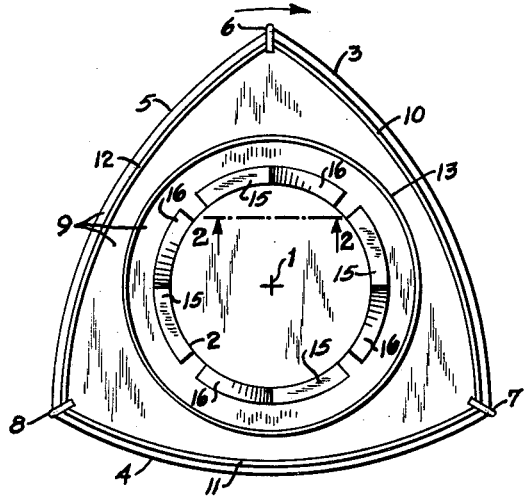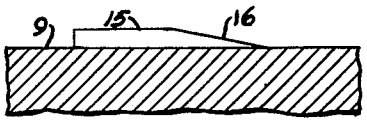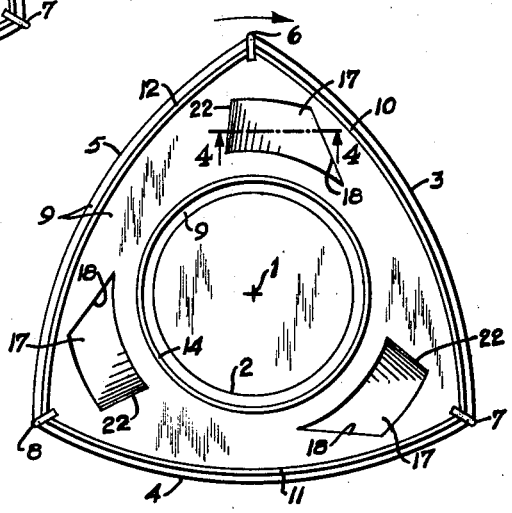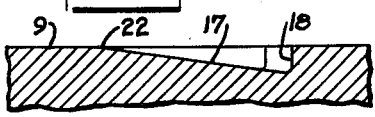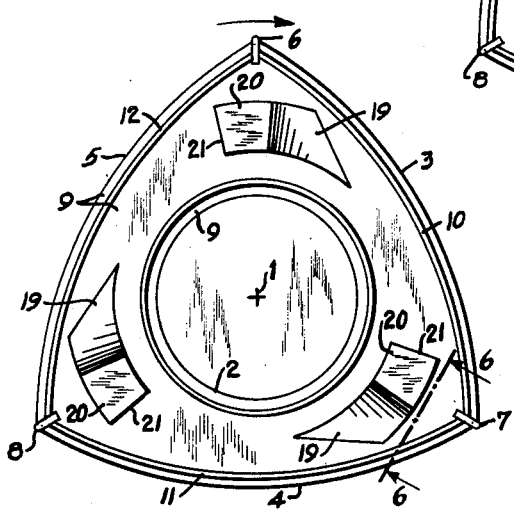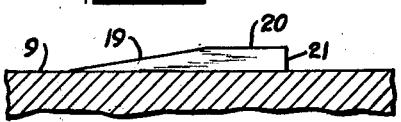
INVENTORS
HERMANN BÄUMLER
HARRY LÖRCHER
ATTORNEY з,193,052
Patented July 6, 1965

The invention disclosed herein is concerned with a rotor for rotary piston machines.

In the socalled circular piston- or rotary piston machines, a substantially cylindrical rotor with substantially plane end surfaces extending perpendicularly to the axis of rotation, rotates eccentrically between two planes, parallel walls of an outer housing. Sealing bars and sealing rings serve in customary manner for the sealing of the surfaces running with respect to one another, such sealing members being built into the end surfaces of the rotor and being movable and resilient in axial direction.

Particular means for holding the rotor against axial shifting have not been built-in heretofore. Force such as may be caused by gas pressure, oil pressure, twisting forces in the bearings or the gear means, acting on one end of the piston and tending to press it against a side wall, must be absorbed either by the sealing bars or the sealing ring or by the end planes of the rotor. As a result, there is produced strong friction and consequently great wear owing to high planar pressure occurring undesirably at the sealing bars and the sealing ring as well as between the end surfaces of the rotor and the wall and due to the fact that there is on account of the planar relationship no effectively operative lubricating film built up between the end surface of the rotor and the wall.

As compared with this situation, the present invention provides for running of the rotor which is relatively free of friction even in the presence of shifting forces acting thereon. This is accomplished by providing on the end walls of the rotor surfaces which are in the direction of rotation slightly inclined with respect to the walls of the outer housing. Upon rotation, the oil which is present between the end wall of the rotor and the wall of the outer housing, is pressed into the narrowing gap, thereby producing an effective lubricating cushion.

Details of the invention will appear from the description which is rendered below with reference to the accompanying drawing wherein:

FIG. 1 is an end elevational view of a rotor embodying the invention;

FIG. 2 is a side elevational view of the inclined portions 15–16 of FIG. 1 taken approximately on the line 2—2 of FIG. 1;

FIG. 3 is a view similar of FIG. 1 illustrating a modified structure;

FIG. 4 is a fragmentary sectional view similar to FIG. 2, taken approximately on the line 4—4 of FIG. 3;

FIG. 5 is a view similar to FIG. 1 illustrating a further modification; and

FIG. 6 is a sectional view taken approximately on the line 6—6 of FIG. 5.

FIG. 1 of the drawing shows in simplified manner the end view of a rotor of a rotating piston or circular piston machine, which is to rotate about its axis 1 in the direction indicated by the arrow. There are shown, in the figures of the drawing, three different embodiments within the three sections of the rotor which are separated by undulating radially extending lines.

The parts which are common to all three embodiments of the rotor, are the axis of rotation 1, the inner cylindrical journal receiving bore 2, the three outer peripheral surfaces 3, 4, 5 with the radially extending sealing elements 6, 7, 8 and the end surfaces 9. Parts which are partially common include the sealing bars 10, 11, 12 which are resiliently built-in and the sealing ring respectively indicated at 13 and 14.

In FIGS. 1 and 2 of the drawing is shown an embodiment of the invention comprising, arranged within the sealing ring 13, planar parts 15 which project axially from each of the two axially-spaced end surfaces 9 of the rotor. The transition from the protruding planes 15 to the level of the end surface 9 consists of ramp-like inclined surfaces 16 disposed at the leading edge of the projections 15 relative to the direction of rotor rotation. Upon rotation of the rotor, there is built up an oil pressure in the gap between the inclined surfaces 16 and the side wall of the outer housing, such oil pressure acting over the inclined surfaces 16 and in a given case over the contiguous parallel surfaces 15, to support the rotor with respect to shifting forces, and being in cooperation with similarly arranged surfaces at the opposite end of the rotor, operative to center the rotor in its central position.

In the embodiments of FIGS. 3 to 6 of the drawing, the planes of surfaces provided according to the invention, are arranged outside of the sealing ring 14. Experience has taught that there is at the corresponding planes suffiicent oil for the building up of a lubricating wedge. The inclined surface in connection with the embodiment of FIGS. 3 and 4 of the drawing are the surfaces 17, and in FIGS. 5 and 6 are the surfaces 19. In FIGS. 3 and 4, the plane or surface 17 is sunk into the end surface 9. In the embodiment of FIGS. 5 and 6, the inclined surface 19 rises in peripheral direction gradually beyond the level of the end surface 9; if desired, a surface 20, extending plane-parallel with respect to the end surface 9 may be arranged continguous to the inclined surface 19, the transition to the level of the end surface 9 being effected at the edge 21.

The inclined surfaces described may be alternatively provided at places of the side walls of the outer housing which are in the rotation of the rotor not swept by the sealing bars or by the sealing ring.

Changes may be made within the scope and spirit of the appended claims which define what is believed to be new and desired to have protected by Letters Patent.

We claim:

1. A rotor for rotation within a rotary piston machine; said rotor having axially-spaced end wall surfaces and a peripheral wall surface interconnecting said end wall surfaces and having a journal receiving bore therethrough, each of said rotor end wall surfaces having a plurality of circumferentially-spaced projections rigid with the rotor and projecting axially therefrom such that said rotor has its maximum axial width between the outer portions of the projections on one rotor end surface and the corresponding outer portions of the projections on the other rotor end surface, said rotor also having means for carrying seal ring means on each of its end surfaces coaxial with its journal receiving bore and radially outwardly of said projections.

2. A rotor as claimed in claim 1 in which each of said projections have a ramp-like portion disposed at the leading edge of said projection relative to the direction of rotor rotation and interconncecting the associated rotor and surface with the outer portion of said projection.

3. A rotor for rotation within a rotary piston machine; said rotor having axially-spaced end wall surfaces and a peripheral wall surface interconnecting said end wall surfaces and having a journal receiving bore therethrough, each of said rotor end wall surfaces having a plurality of circumferentially-spaced projections rigid with the rotor and projection axially therefrom such that said rotor has its maximum width between the outer portions of the projections on one rotor end surface and the corresponding outer portions of the projections on the other rotor end surface, each of said projections having a ramp-like portion disposed at the leading edge of said projection relative to the direction of rotor rotation and interconnecting the associated rotor end surface with the outer portion of said projection.

References Cited by the Examiner

UNITED STATES PATENTS

| | | | |
|---|---|---|---|
| 2,155,455 | 4/39 | Thoma | 308—160 |
| 2,731,305 | 1/56 | Wilcock | 308—160 |
| 3,081,745 | 3/63 | Hurley | 123—8 |

LAVERNE D. GEIGER, *Primary Examiner.*

MILTON KAUFMAN, *Examiner.*